US012278037B2

(12) United States Patent
Endo et al.

(10) Patent No.: US 12,278,037 B2
(45) Date of Patent: Apr. 15, 2025

(54) COIL COMPONENT

(71) Applicant: TDK CORPORATION, Tokyo (JP)

(72) Inventors: Masaki Endo, Tokyo (JP); Tomonaga Nishikawa, Tokyo (JP); Masaki Yoneyama, Tokyo (JP); Liyi Chen, Tokyo (JP); Azuma Satoh, Minami-Alps (JP)

(73) Assignee: TDK CORPORATION, Tokyo (JP)

( * ) Notice: Subject to any disclaimer, the term of this patent is extended or adjusted under 35 U.S.C. 154(b) by 1012 days.

(21) Appl. No.: 17/189,835

(22) Filed: Mar. 2, 2021

(65) Prior Publication Data

US 2021/0280353 A1 Sep. 9, 2021

(30) Foreign Application Priority Data

Mar. 6, 2020 (JP) ................................ 2020-038546

(51) Int. Cl.
*H01F 27/28* (2006.01)
*H01F 27/24* (2006.01)
*H01F 27/29* (2006.01)

(52) U.S. Cl.
CPC ......... *H01F 27/2804* (2013.01); *H01F 27/24* (2013.01); *H01F 27/29* (2013.01); *H01F 2027/2809* (2013.01)

(58) Field of Classification Search
CPC ......... H01F 27/2804; H01F 2027/2809; H01F 17/0013; H01F 17/0006; H01F 5/003; H01F 27/24; H01F 27/29; H01F 27/292; H01F 27/323
USPC .................................................. 336/200, 232
See application file for complete search history.

(56) References Cited

U.S. PATENT DOCUMENTS

2014/0132385 A1 5/2014 Maruyama et al.
2016/0099100 A1* 4/2016 Park .................... H01F 17/0013 336/200
2017/0103845 A1* 4/2017 Nagai ........................ H01F 3/14
2017/0148562 A1* 5/2017 Lee ........................ H01F 27/292
2017/0287621 A1 10/2017 Seino et al.
2017/0301453 A1* 10/2017 Jo ........................ H01F 17/0013
2018/0033549 A1* 2/2018 Taniguchi ............. H01F 41/041
2018/0315541 A1* 11/2018 Okura ...................... H01F 27/29
2018/0323003 A1 11/2018 Fujii et al.
2018/0358169 A1* 12/2018 Nishikawa ............ H01F 27/292

(Continued)

FOREIGN PATENT DOCUMENTS

JP 2007067214 A * 3/2007
JP 2016-197692 A 11/2016

(Continued)

*Primary Examiner* — Tszfung J Chan
(74) *Attorney, Agent, or Firm* — YOUNG LAW FIRM, P.C.

(57) ABSTRACT

Disclosed herein is a coil component that includes a a coil area in which first to third coil patterns are disposed and a terminal area positioned outside the coil area. The outer peripheral end of the first coil pattern is connected to the first terminal electrode. The inner peripheral end of the first coil pattern is connected to an inner peripheral end of the second coil pattern. The outer peripheral end of the second coil pattern is connected to an outer peripheral end of the third coil pattern. A via conductor connecting the outer peripheral ends of the second and third coil patterns is disposed at a position overlapping the terminal area.

9 Claims, 4 Drawing Sheets

(56) References Cited

U.S. PATENT DOCUMENTS

| | | | | |
|---|---|---|---|---|
| 2019/0096558 | A1 | 3/2019 | Ito et al. | |
| 2020/0027645 | A1* | 1/2020 | Yoshioka | H01F 27/323 |

FOREIGN PATENT DOCUMENTS

| | | | | |
|---|---|---|---|---|
| JP | 2018046081 | A * | 3/2018 | H01F 17/00 |
| JP | 2018190828 | A | 11/2018 | |
| WO | WO-2015037374 | A1 * | 3/2015 | H01F 17/0013 |
| WO | WO-2017212990 | A1 * | 12/2017 | B06B 1/04 |

* cited by examiner

COIL COMPONENT

BACKGROUND OF THE INVENTION

Field of the Invention

The present invention relates to a coil component and, more particularly, to a coil component having a structure in which a coil part including a plurality of spirally wound coil patterns is embedded in a magnetic element body.

Description of Related Art

JP 2018-190828A discloses a coil component having a structure in which a coil part including a plurality of spirally wound coil patterns is embedded in a magnetic element body. When a coil part is embedded in the magnetic element body like the coil part described in JP 2018-190828A, the magnetic element body functions as a magnetic path, allowing a high inductance value to be achieved.

When a plurality of stacked coil patterns are connected in series, the inner peripheral end of a first coil pattern is connected to the inner peripheral end of a second coil pattern adjacent thereto on the axial one side (e.g., lower side), and the outer peripheral end of the first coil pattern is connected to the outer peripheral end of a third coil pattern adjacent thereto on the axial other side (e.g., upper side). The coil patterns are connected using a via conductor. Thus, it is necessary to increase the size of the coil pattern at its inner and outer peripheral ends for reliable connection between the coil pattern and the via conductor.

However, the increase in the size of the coil pattern at its inner and outer peripheral ends correspondingly reduces the volume of the magnetic element body, reducing an inductance value.

SUMMARY

It is therefore an object of the present invention to provide a coil component having a structure in which a coil part including a plurality of spirally wound coil patterns is embedded in a magnetic element body, capable of having a sufficient volume of the magnetic element body.

A coil component according to an aspect of the present invention includes: a coil part having a structure in which a plurality of spirally wound coil patterns are axially stacked and connected in series; a first terminal electrode connected to one end of the coil part; a second terminal electrode connected to the other end of the coil part; and a magnetic element body embedding therein the coil part, wherein, the coil component has a coil area in which the coil part is disposed, a first terminal area positioned outside the coil area as viewed in the axial direction and the first terminal electrode being disposed, a second terminal area positioned outside the coil area as viewed in the axial direction and the second terminal electrode being disposed, an inner diameter area surrounded by the coil area and a part of the magnetic element body being disposed, and an outside area positioned outside the coil area as viewed in the axial direction and another part of the magnetic element body being disposed, the plurality of coil patterns include at least first, second, and third coil patterns, the outer peripheral end of the first coil pattern is connected to the first terminal electrode, the inner peripheral end of the first coil pattern is connected to the inner peripheral end of the second coil pattern, the outer peripheral end of the second coil pattern is connected to the outer peripheral end of the third coil pattern, and a via conductor connecting the outer peripheral ends of the second and third coil patterns is disposed at a position overlapping the first terminal area or second terminal area.

A coil component according to another aspect of the present invention includes: a coil part having a structure in which a plurality of spirally wound coil patterns are axially stacked and connected in series; a first terminal electrode connected to one end of the coil part; a second terminal electrode connected to the other end of the coil part; and a magnetic element body embedding therein the coil part, wherein, the coil component has a coil area in which the coil part is disposed, a first terminal area positioned outside the coil area as viewed in the axial direction and the first terminal electrode being disposed, a second terminal area positioned outside the coil area as viewed in the axial direction and the second terminal electrode being disposed, an inner diameter area surrounded by the coil area and a part of the magnetic element body being disposed, and an outside area positioned outside the coil area as viewed in the axial direction and another part of the magnetic element body being disposed, the outside area includes a cut-away area positioned between the coil area and the first terminal area, the plurality of coil patterns include at least first, second, and third coil patterns, the outer peripheral end of the first coil pattern is connected to the first terminal electrode, the inner peripheral end of the first coil pattern is connected to the inner peripheral end of the second coil pattern, the outer peripheral end of the second coil pattern is connected to the outer peripheral end of the third coil pattern, and a via conductor connecting the outer peripheral ends of the second and third coil patterns is disposed at a position overlapping the cut-away area.

According to the present invention, the via conductor connecting the outer peripheral ends of the coil patterns is disposed at a position overlapping the first or second terminal area or at a position overlapping the cut-away area, so that it is possible to increase the size of the coil pattern at its outer peripheral end without reducing the volume of the magnetic element body.

In the present invention, a via conductor connecting the inner peripheral ends of the first and second coil patterns may be disposed so as to bite into the inner diameter area. This makes it possible to increase the size of the coil pattern at its inner peripheral end while minimizing a reduction in the volume of the magnetic element body.

As described above, according to the present invention, there can be provided a coil component having a structure in which a coil part including a plurality of spirally wound coil patterns is embedded in a magnetic element body, capable of having a sufficient volume of the magnetic element body. Thus, the coil component according to the present invention can have a higher inductance value than conventional coil components.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
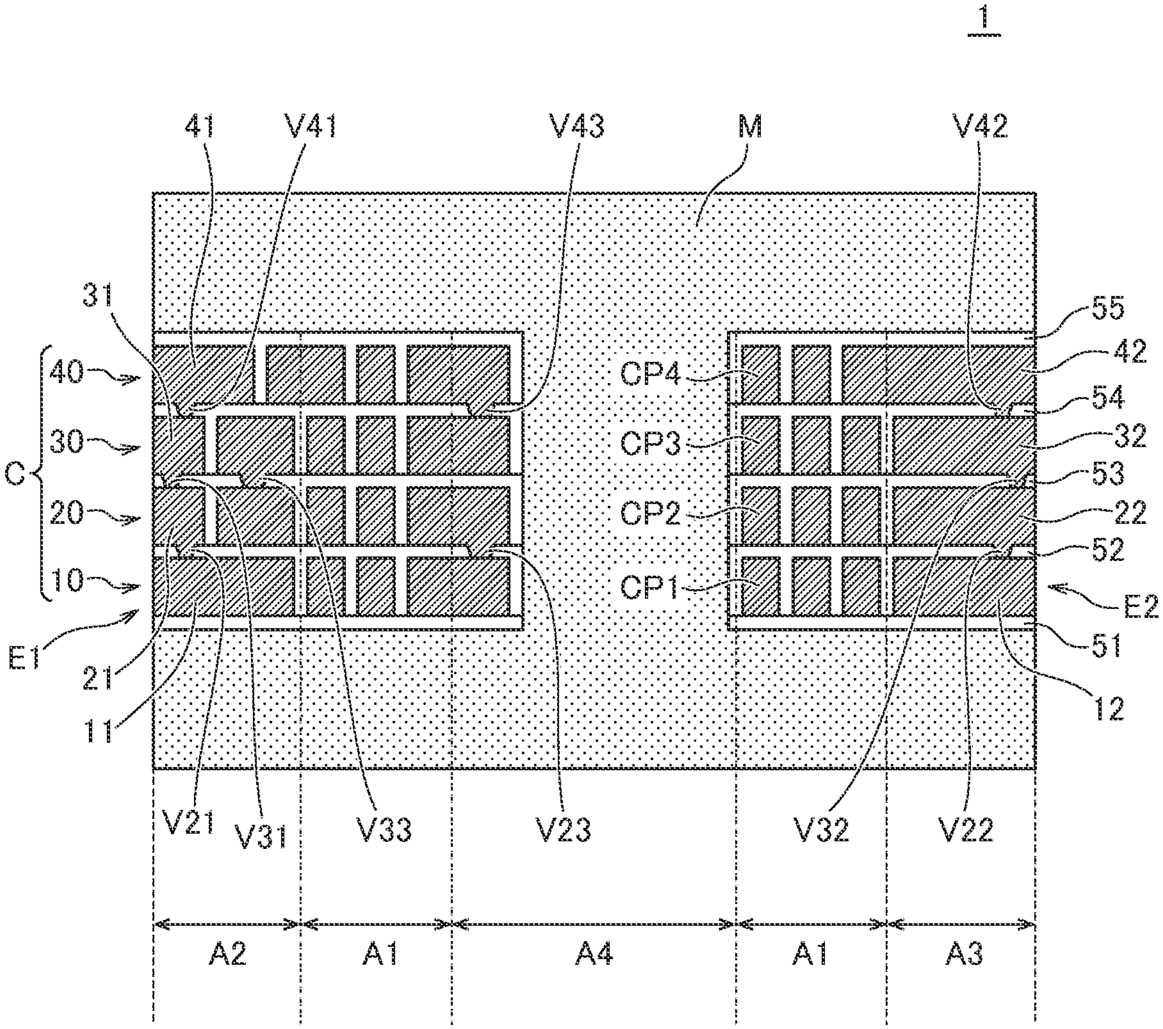
FIG. 1 is a schematic cross-sectional view for explaining the structure of a coil component 1 according to an embodiment of the present invention.

FIG. 1 is a schematic cross-sectional view for explaining the structure of a coil component 1 according to an embodiment of the present invention.

The coil component 1 according to an embodiment of the present invention is a surface mount chip component suitably used as an inductor for a power supply circuit and includes a magnetic element body M and a coil part C embedded in the magnetic element body M as illustrated in FIG. 1. In the present embodiment, the coil part has a configuration in which four conductive layers each having a spiral coil pattern are stacked through interlayer insulating films to thereby form one coil conductor. A detailed configuration of the coil part C will be described later.

The magnetic element body M is a composite member containing metal magnetic filler made of iron (Fe) or a permalloy-based material and a resin binder. The magnetic element body M constitutes a magnetic path for magnetic flux which is generated when current is made to flow in the coil part C. As the resin binder, epoxy resin of liquid or powder is preferably used. In the cross section illustrated in FIG. 1, the magnetic element body M is disposed at a portion vertically sandwiching the coil part C in the axial direction and at the inner diameter area of the coil part C. Further, as described later, the magnetic element body M is also disposed outside the coil part C as viewed in the axial direction.

As illustrated in FIG. 1, the coil part C has a configuration in which conductive layers 10, 20, 30, and 40 are stacked through interlayer insulating films 51 to 55. The conductive layers 10, 20, 30, and 40 have spiral coil patterns CP1, CP2, CP3, and CP4, respectively, and the coil patterns CP1 to CP4 are covered with the interlayer insulating films 51 to 55 at their upper surface or lower surface. The side surfaces of the coil patterns CP1 to CP4 are also covered with parts of the interlayer insulating films 52 to 55. The upper and lower surfaces of the coil patterns CP1 to CP4 refer to a surface perpendicular to the coil axis, and the side surfaces thereof refer to a surface parallel to or inclined to the coil axis.

The coil patterns CP1 to CP4 are connected in series through a via conductor penetrating the interlayer insulating films 52 to 54 to thereby constitute one coil conductor. The conductive layers 10, 20, 30, and 40 are preferably made of copper (Cu). The pattern shapes of the respective conductive layers 10, 20, 30, and 40 are illustrated in FIGS. 2 to 5. The cross section illustrated in FIG. 1 corresponds to the cross sections taken along line B-B in FIGS. 2 to 5.

Figure 2:
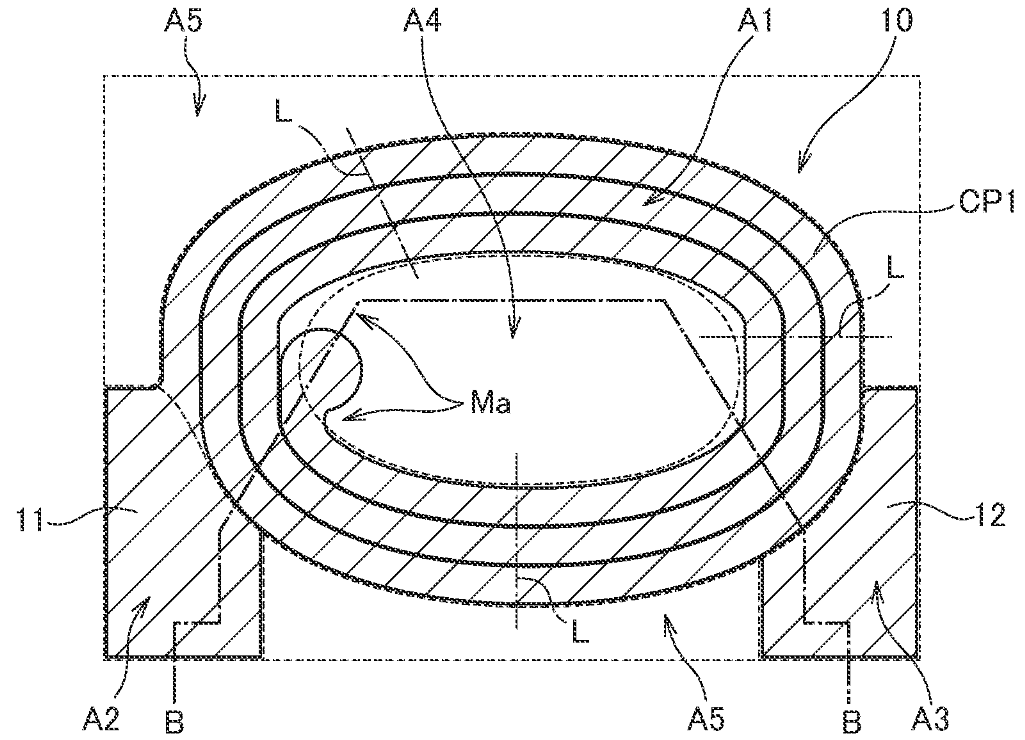
FIG. 2 is a schematic plan view for illustrating a conductive layer 10.

The conductive layer 10 is a first conductor layer formed on the interlayer insulating film 51 and includes the coil pattern CP1 having three spirally-wound turns and two electrode patterns 11 and 12 as illustrated in FIG. 2. The outer peripheral end of the coil pattern CP1 is connected to the electrode pattern 11. The electrode pattern 12 is provided independently of the coil pattern CP1.

Figure 3:
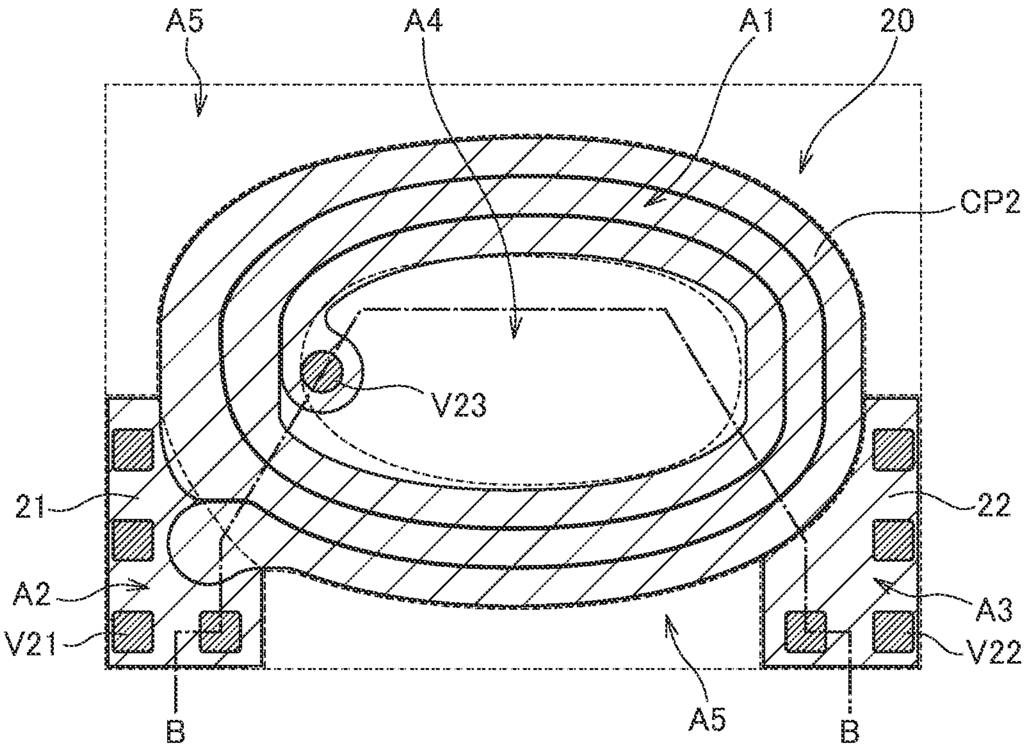
FIG. 3 is a schematic plan view for illustrating a conductive layer 20.

The conductive layer 20 is a second conductive layer formed on the upper surface of the conductive layer 10 through the interlayer insulating film 52 and includes the coil pattern CP2 having three spirally-wound turns and two electrode patterns 21 and 22 as illustrated in FIG. 3. As illustrated in FIG. 3, the electrode patterns 21 and 22 are both provided independently of the coil pattern CP2. The electrode pattern 21 is connected to the electrode pattern 11 through a plurality of via conductors V21 penetrating the interlayer insulating film 52. Similarly, the electrode pattern 22 is connected to the electrode pattern 12 through a plurality of via conductors V22 penetrating the interlayer insulating film 52. The inner peripheral end of the coil pattern CP2 is connected to the inner peripheral end of the coil pattern CP1 through a via conductor V23 penetrating the interlayer insulating film 52.

Figure 4:
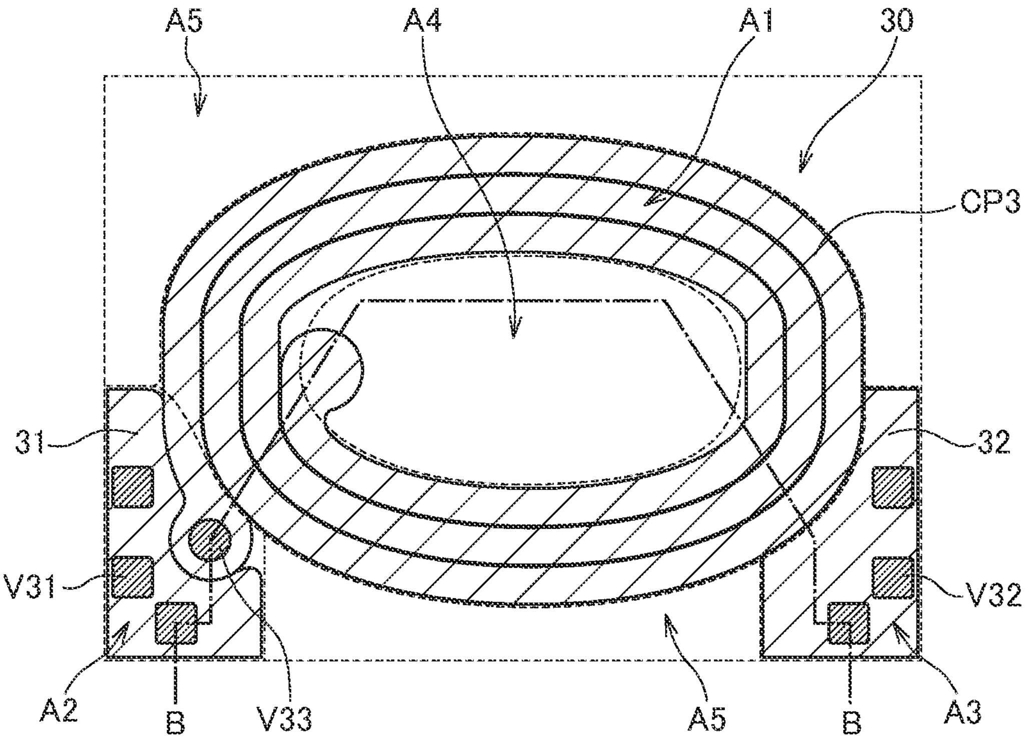
FIG. 4 is a schematic plan view for illustrating a conductive layer 30.

The conductive layer 30 is a third conductive layer formed on the upper surface of the conductive layer 20 through the interlayer insulating film 53 and includes the coil pattern CP3 having three spirally-wound turns and two electrode patterns 31 and 32 as illustrated in FIG. 4. As illustrated in FIG. 4, the electrode patterns 31 and 32 are both provided independently of the coil pattern CP3. The electrode pattern 31 is connected to the electrode pattern 21 through a plurality of via conductors V31 penetrating the interlayer insulating film 53. Similarly, the electrode pattern 32 is connected to the electrode pattern 22 through a plurality of via conductors V32 penetrating the interlayer insulating film 53. The outer peripheral end of the coil pattern CP3 is connected to the outer peripheral end of the coil pattern CP2 through a via conductor V33 penetrating the interlayer insulating film 53. The via conductors V31 are provided at planar positions offset with respect to the via conductors V21 as viewed in the axial direction, and the via conductors V32 are provided at planar positions offset with respect to the via conductors V22 as viewed in the axial direction, thereby reducing surface unevenness due to overlap of the via conductors.

Figure 5:
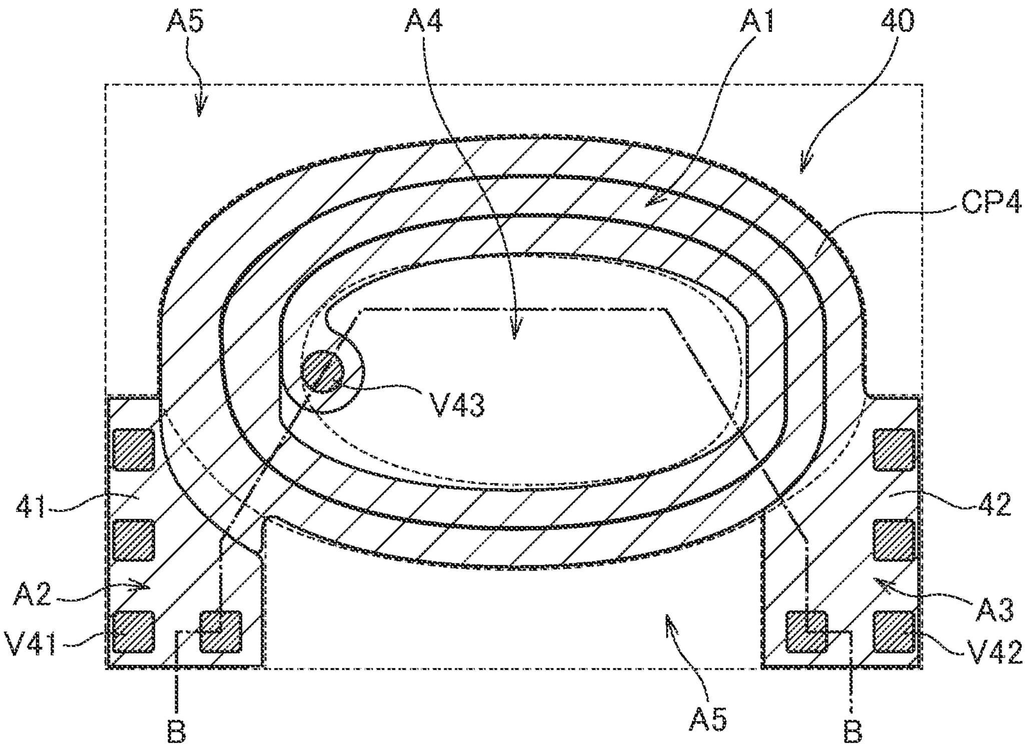
FIG. 5 is a schematic plan view for illustrating a conductive layer 40.

The conductive layer 40 is a fourth conductive layer formed on the upper surface of the conductive layer 30 through the interlayer insulating film 54 and includes the coil pattern CP4 having 2.5 spirally-wound turns and two electrode patterns 41 and 42 as illustrated in FIG. 5. The outer peripheral end of the coil pattern CP4 is connected to the electrode pattern 42. The electrode pattern 41 is provided independently of the coil pattern CP4. The electrode pattern 41 is connected to the electrode pattern 31 through a plurality of via conductors V41 penetrating the interlayer insulating film 54. Similarly, the electrode pattern 42 is connected to the electrode pattern 32 through a plurality of via conductors V42 penetrating the interlayer insulating film 54. The inner peripheral end of the coil pattern CP4 is connected to the inner peripheral end of the coil pattern CP3 through a via conductor V43 penetrating the interlayer insulating film 54. The via conductors V41 are provided at planar positions offset with respect to the via conductors V31 as viewed in the axial direction, and the via conductors V42 are provided at planar positions offset with respect to the via conductors V32 as viewed in the axial direction, thereby reducing surface unevenness due to overlap of the via conductors.

As a result, the coil patterns CP1 to CP4 are connected in series to form a coil conductor having 11.5 turns in total. The electrode patterns 11, 21, 31, and 41 are short-circuited to one another and exposed from the magnetic element body M to serve as a first terminal electrode E1. The electrode patterns 12, 22, 32, and 42 are short-circuited to one another and exposed from the magnetic element body M to serve as a second terminal electrode E2.

As illustrated in FIGS. 1 to 5, the coil component 1 according to the present embodiment can be sectioned into areas A1 to A5 as viewed in the axial direction. The area A1 is a coil area A1 where the coil patterns CP1 to CP4 of the coil part C are disposed. The area A2 is a first terminal area positioned outside the coil area A1 and including the first terminal electrode E1. The area A3 is a second terminal area positioned outside the coil area A1 and including the second terminal electrode E2. The area A4 is an inner diameter area surrounded by the coil area A1 and including a part of the magnetic element body M. The area A5 is an outside area positioned outside the coil area A1 and including the remaining part of the magnetic element body M.

In the present embodiment, the via conductor V33 connecting the outer peripheral ends of the coil patterns CP2 and CP3 is disposed at a position overlapping the first terminal area A2. At the connection position between the coil patterns CP2, CP3 and the via conductor V33, specifically, at the outer peripheral ends of the coil patterns CP2 and CP3, the coil patterns CP2 and CP3 each have an increased pattern width, thereby providing a reliable connection between the coil patterns CP2 and CP3 through the via conductor V33. However, if the via conductor 33V is disposed in the outside area A5, the volume of the magnetic element body M is reduced by the amount of the increased width of each of the coil patterns CP2 and CP3. In the coil component 1 according to the present embodiment, the via conductor V33 is disposed at a position overlapping the first terminal area A2, so that it is possible to connect the outer peripheral ends of the coil patterns CP2 and CP3 without reducing the volume of the magnetic element body M.

The via conductor V23 connecting the inner peripheral ends of the coil patterns CP1 and CP2 is disposed so as to bite into the inner diameter area A4. At the connection position between the coil patterns CP1, CP2 and the via conductor V23, i.e., at the inner peripheral ends of the coil patterns CP1 and CP2, the coil patterns CP1 and CP2 each have an increased pattern width, thereby providing a reliable connection between the coil patterns CP1 and CP2 through the via conductor V23. However, when the magnetic element body M is removed not only at the inner peripheral end of each of the coil patterns CP1 and CP2 but also at its surrounding area, the volume of the magnetic element body M to fill in the inner diameter area A4 decreases. In the coil component 1 according to the present embodiment, the via conductor V23 is disposed so as to bite into the inner diameter area A4, and thus the magnetic element body M positioned in the inner diameter area A4 has a protruding part Ma, which is positioned between the inner peripheral end of each of the coil patterns CP1, CP2 and the winding pattern of each thereof. The protruding part Ma is close to the magnetic element body M provided in the outside area A5, allowing an increase in inductance value.

As described above, in the coil component 1 according to the present embodiment, the via conductor V33 connecting the outer peripheral ends of the coil patterns CP2 and CP3 is disposed at a position overlapping the first terminal area A2, so that the volume of the magnetic element body M does not decrease. However, the via conductor V33 may not necessarily be disposed overlapping the first terminal area A2, but may be disposed overlapping the second terminal area A3. Even in this case, the volume of the magnetic element body M does not decrease, allowing a high inductance value to be achieved.

When the straight line L (see FIG. 2) radially extending from the inner diameter area A4 to the outside area A5 is defined, the number of patterns positioned on the straight line L does not exceed three in any of the coil patterns CP1 to CP4 (three in CP1 to CP3, and two or three in CP4) irrespective of the position of the straight line L. Thus, it is possible to prevent such a disadvantage that four patterns, for example, are locally radially arranged to reduce the volume of the magnetic element body M at this portion.

Figure 6:
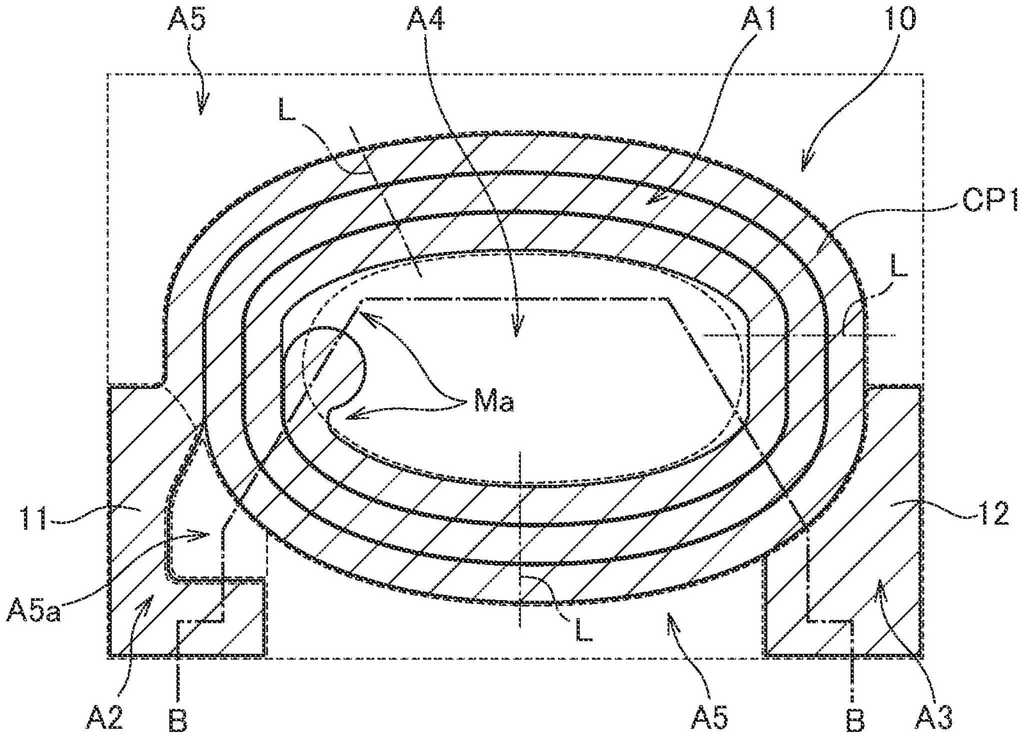
FIG. 6 is a schematic plan view illustrating the pattern shape of the conductive layer 10 according to a modification.

FIG. 6 is a schematic plan view illustrating the pattern shape of the conductive layer 10 according to a modification.

The conductive layer 10 according to the modification illustrated in FIG. 6 differs in pattern shape from the conductive layer 10 illustrated in FIG. 2 in that the electrode pattern 11 is partially cut away. Other configurations are the same as those of the conductive layer 10 illustrated in FIG. 2, so the same reference numerals are given to the same elements, and overlapping description will be omitted.

As illustrated in FIG. 6, the cut-away part of the electrode pattern 11 serves as a cut-away area A5*a* which is included in the outside area A5 and positioned between the coil area A1 and the first terminal area A2. The cut-away area A5*a* overlaps the via conductor V33 illustrated in FIG. 4. Even in this configuration, the same effects as in the above embodiment can be obtained.

It is apparent that the present invention is not limited to the above embodiments, but may be modified and changed without departing from the scope and spirit of the invention.

What is claimed is:

1. A coil component comprising:

a first conductive layer including a first coil pattern and a first electrode pattern connected to an outer peripheral end of the first coil pattern;

a second conductive layer including a second coil pattern and a second electrode pattern provided independently of the second coil pattern;

a third conductive layer including a third coil pattern and a third electrode pattern provided independently of the third coil pattern;

a first via conductor connected between an inner peripheral end of the first coil pattern and an inner peripheral end of the second coil pattern;

a second via conductor connected between an outer peripheral end of the second coil pattern and an outer peripheral end of the third coil pattern;

a third via conductor connected between the first electrode pattern and the second electrode pattern, and a fourth via conductor connected between the second electrode pattern and the third electrode pattern, wherein the first electrode pattern has a first region overlapping the second and third electrode patterns and a second region overlapping the second via conductor.

2. The coil component as claimed in claim 1, further comprising a magnetic member arranged so as to be surrounded by the first, second, and third coil patterns, wherein the magnetic member has a first protruding part arranged so as to be sandwiched between an innermost turn of the first coil pattern and the inner peripheral end of the first coil pattern.

3. The coil component as claimed in claim 2, wherein the magnetic member further has a second protruding part arranged so as to be sandwiched between an innermost turn of the second coil pattern and the inner peripheral end of the second coil pattern.

4. The coil component as claimed in claim 3, wherein the first and second protruding parts do not overlap each other.

5. The coil component as claimed in claim 4, wherein the magnetic member further has a third protruding part arranged so as to be sandwiched between an innermost turn of the third coil pattern and an inner peripheral end of the third coil pattern.

6. The coil component as claimed in claim 5, wherein the first and third protruding parts overlap each other.

7. The coil component as claimed in claim 1, further comprising a magnetic member embedding therein the first, second, and third conductive layers, wherein the first, second, and third electrode patterns are exposed from the magnetic member.

8. The coil component as claimed in claim 7, wherein the second electrode pattern and the outer peripheral end of the second coil pattern are adjacent to each other without the magnetic member being interposed therebetween.

9. The coil component as claimed in claim 1, wherein a plurality of the third via conductors are provided, and wherein a plurality of the fourth via conductors are provided.

* * * * *